United States Patent

[11] 3,585,458

| [72] | Inventor | Koichi Yoshimura<br>Kadoma-shi, Japan |
| --- | --- | --- |
| [21] | Appl. No. | 749,477 |
| [22] | Filed | Aug. 1, 1968 |
| [45] | Patented | June 15, 1971 |
| [73] | Assignee | Matsushita Electric Industrial Co., Ltd.<br>Osaka, Japan |
| [32] | Priority | Aug. 9, 1967, Aug. 17, 1967, Aug. 17,<br>1967, Aug. 17, 1967, Aug. 17, 1967, Aug.<br>17, 1967, Aug. 17, 1967, Aug. 21, 1967 |
| [33] | | Japan |
| [31] | | 42/51606, 42/53399, 42/53400, 42/53401,<br>42/53403, 42/53404, 42/53405, 42/54164 |

[54] ELECTROMAGNETIC INDUCTION RESPONSIVE DEVICE
7 Claims, 14 Drawing Figs.

[52] U.S. Cl. .................................................... 317/156TR,
335/149, 335/226
[51] Int. Cl. .................................................... H01h 53/015
[50] Field of Search ............................................ 335/149,
226; 317/156 TR

[56] References Cited
UNITED STATES PATENTS
| 1,711,285 | 4/1929 | Petersen ..................... | 335/226 |
| 1,993,946 | 3/1935 | Rhine .......................... | 335/149 X |
| 1,996,606 | 4/1935 | Ayers .......................... | 335/226 |
| 1,269,481 | 6/1918 | Matthews .................... | 335/149 |

*Primary Examiner*—Lee T. Hix
*Attorney*—Stevens, Davis, Miller and Mosher

ABSTRACT: An electromagnetic induction responsive device adapted for closing or opening a contact mechanism and driving a brake shoe, clutch or the like, wherein no movable core is provided, and electric power induced from a primary coil into a secondary coil is utilized to cause an electromagnetic force to occur in the coils.

INVENTOR
KOICHI YOSHIMURA

BY Stevens, Davis, Miller & Mosher

ATTORNEYS

ELECTROMAGNETIC INDUCTION RESPONSIVE DEVICE

This invention relates to an electromagnetic induction responsive device, and more particularly it pertains to such device adapted for opening and closing a contact mechanism or driving a brake shoe, clutch or the like.

In such devices as electromagnetic relay for opening or closing a contact mechanism by utilizing an electromagnetic force, electromagnetic brake for driving a brake shoe by utilizing an electromagnetic force, electromagnetic clutch for driving a clutch, and so forth, the driving force is obtained through a lever mechanism connected with a movable core which is pulled to a fixed core which is excited. In the magnetic circuit of a device of this type, there exists a high reluctance due to a gap defined between the fixed core and the movable core. Because of such high reluctance, a great magnetomotive force is required to operate the aforementioned electromagnetic induction responsive device. To meet such requirement, an attempt has heretofore been made to increase the number of turns of the excitation coil to be wound on the fixed core and cause an increased current to flow through the excitation coil. Disadvantageously, however, increasing the number of turns of the excitation coil makes the device large-sized, and increasing the excitation current leads to an increase in power loss.

The present invention intends to solve the foregoing various problems of the conventional devices.

It is a primary object of this invention to provide an electromagnetic induction responsive device wherein the magnetic circuit thereof includes no gap portion, that is, it is in the form of a closed loop.

A second object of the present invention is to provide an electromagnetic induction responsive device wherein no movable core is required so that the movable portion thereof is greatly simplified.

A third object of the present invention is to provide a miniaturized electromagnetic induction responsive device wherein a sufficient driving force can be obtained from a small magnetomotive force.

A fourth object of the present invention is to provide an electromagnetic induction responsive device which is well suited to be used as electromagnetic relay of which the movable portion is to be quickly driven to cause contacts to be momentarily made or broken.

A fifth object of the present invention is to provide an electromagnetic induction responsive device which is well suited to be used as electromagnetic brake or electromagnetic clutch of which the movable portion is to be slowly driven to thereby suitably adjust the driving force.

When a primary coil is connected with an AC power source, an alternating magnetic field is established in the space surrounding the primary coil. If a secondary coil is placed in the magnetic field, then it is crossed by a magnetic flux produced by the primary coil, so that a voltage is induced thereacross. The short-circuiting of the secondary coil results in a current flow therein. The current flowing through the secondary coil lags by 180° in respect of phase behind the current flowing through the primary coil. Thus, a magnetic field resulting from the current flow in the primary coil and that resulting from the short circuit current flowing through the secondary coil are 180° out of phase with each other, so that a repulsion force acts between the primary coil and the secondary coil.

By connecting a capacitor across the secondary coil and selecting the impedance based on the capacitance of the capacitor to be sufficiently high as compared with the impedance based on the inductance of the secondary coil, it is possible to make the secondary circuit constituted by the secondary coil and capacitor capacitive. By making the secondary circuit capacitive, the phase of the current flowing through the secondary coil can be made to be substantially in conformity to that of the current flowing through the primary coil. Contrary to the above case, therefore, an attractive force occurs between the primary coil and the secondary coil.

Furthermore, by connecting a parallel connection of a capacitor and a resistor across the secondary coil and changing the resistance value of the resistor, it is possible to change the impedance of the secondary circuit constituted by the secondary coil, capacitor and resistor from inductive to capacitive. Thus, the force acting between the primary coil and the secondary coil can be varied from repulsive force to attractive force, and the magnitude of the force can also be controlled.

Still furthermore, by disposing a third coil besides the secondary coil in the magnetic field produced by the primary coil and short-circuiting the secondary coil and third coil, it is possible that currents which lag by 180° behind the current flowing through the primary coil are caused to flow through the two coils. Thus, the currents flowing through the secondary coil and tertiary coil are in phase with each other, so that an attractive force occurs between these coils while a repulsive force acts between the primary coil and the secondary and tertiary coils.

The electromagnetic induction responsive device according to the present invention utilize such attractive and/or repulsive force acting between the respective coils.

Other objects, features and advantages of the present invention will become apparent from the following description taken in conjunction with the accompanying drawing, in which.

Figure 1:
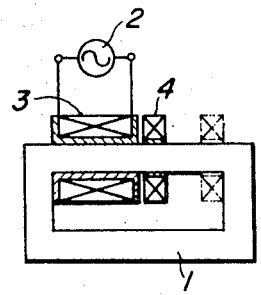
FIG. 1 is a view useful for explaining the principle of the electromagnetic induction responsive device according to the present invention.

Referring to FIG. 1, there is provided a magnetic core 1 formed by lamination of silicon steel plates having directional properties on which is partly wound a primary coil 3 connected with an AC power source 2. Further, a secondary coil 4 is movably wound on the core 1 in close relationship to the primary coil 3.

Figure 2:
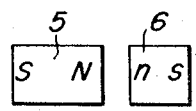
FIG. 2 is a view showing a magnet arrangement which is an equivalent or analogy of the arrangement shown in FIG. 1.

When an alternate current is supplied to the primary coil 3, a magnetic flux resulting from the current flow crosses the secondary coil 4, so that an electromotive force is induced in the coil 4. At this point, if the opposite ends of secondary coil 4 are connected with each other, then a short circuit current resulting from the induced electromotive force flows through the coil 4. The resulting short circuit current lags by about 180 degrees in terms of electrical angle behind the current flowing through the primary coil 3. Thus, a repulsive force such as equivalently represented by magnets 5 and 6 in FIG. 2 acts between the primary and secondary coils 3 and 4. More specifically, a magnetic field resulting from the short circuit current flowing through the secondary coil 4 acts in such direction as to cancel a magnetic field resulting from the current flowing through the primary coil 3. Magnetically, the primary coil 3 is equivalent to the magnet 5, and the secondary coil 4 to the magnet 6, with the corresponding magnetic poles of the magnets 5 and 6 being disposed in opposing relationship to each other. Thus, the secondary coil 4 will be displaced from a position indicated by a solid line to a position indicated by a broken line in FIG. 1.

A force resulting from such displacement is utilized to drive a responsive means such as a contact mechanism brake shoe, clutch or the like (not shown).

It is also possible that in addition to the secondary coil 4, an annular short circuit ring formed of a good electric conductor such as copper, aluminum or the like may be provided in such a manner that it is crossed by a magnetic flux resulting from the current flow through the primary coil 3.

The force acting between the primary and secondary coils 3 and 4 is inversely proportional to the distance therebetween and proportional to the product of the currents flowing through the two coils and the numbers of turns thereof. Thus, the driving characteristic or the relationship between the distance separating the two coils and the force acting therebetween becomes gentle, so that the drive control can be facilitated.

Figure 3:
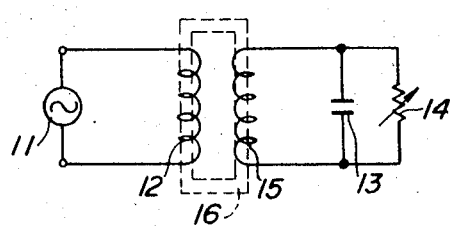
FIG. 3 is a view useful for explaining a modification of the FIG. 1 device.

Referring to FIG. 3, there are provided a primary winding 12 connected with an AC power source 11, a secondary winding 15 across which are connected a capacitor 13 and a variable resistor 14 in parallel with each other, and a magnetic coil 16 increasing the electromagnetic coupling between the primary coil 12 and the secondary coil 15.

The capacitive impedance based on the capacitance of the capacitor 13 is selected to be higher than the inductive impedance based on the inductance of the secondary coil 15.

Figure 4:
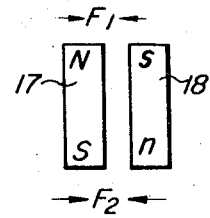
FIGS. 4 and 5 show magnet arrangements each of which is an equivalent or analogy of the arrangement shown in FIG. 3.

In case the resistance value of the variable resistor 14 is considerably increased, the secondary circuit constituted by the secondary coil 15 and capacitor 13 becomes capacitive, so that a current flowing through the secondary circuit becomes close in respect of phase to a current flowing through the primary coil 12. Hence, an attractive force acts between the primary coil 12 and the secondary coil 15. Such state is equivalently shown in FIG. 4. That is, the primary coil 12 is magnetically equivalent to a magnet 17, and the secondary coil 15 to a magnet 18. As shown in FIG. 4, the N pole of the magnet 17 is disposed in opposing relationship to the S pole of the magnet 18, and the S pole of the magnet 17 is placed in opposing relationship to the N pole of the magnet 18. Thus, an attractive force occurs between the two magnets.

Figure 5:
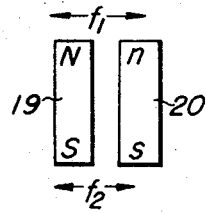

For a low resistance of the variable resistor 14, the electrodes of the capacitor 13 are substantially short-circuited, so that the capacitive impedance becomes negligibly low. Thus, in the secondary circuit the inductive impedance resulting from the inductance of the secondary coil 15 becomes predominant, so that the primary coil 12 now becomes magnetically equivalent to a magnetic 19 and the secondary coil 15 to a magnet 20, as shown in FIG. 5. The magnets 19 and 20 are placed in such a manner that the corresponding magnetic poles are disposed in opposing relationship to each other, and thus a repulsive force acts therebetween, as described above in connection with FIG. 1.

Figure 6:
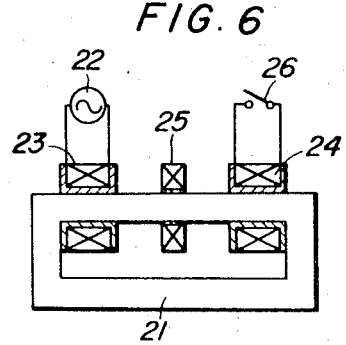
FIG. 6 is a view useful for explaining another modification of the device shown in FIG. 1.

Referring now to FIG. 6, a primary coil 23 to be connected with an AC power source 22 is wound on part of a magnetic core 21 constituting a closed loop of magnetic circuit. Further, a secondary coil 24 is wound on the magnetic core 21, and a tertiary coil 25 having the opposite ends thereof connected with each other is movably interposed between the primary coil 23 and the secondary coil 24. A switch 26 is connected across the secondary coil 24 to thereby open or close the coil.

Figure 7:
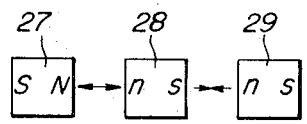
FIG. 7 shows a magnet arrangement which is an equivalent or analogy of the FIG. 6 arrangement; the FIG. 8 is a view showing a modification of the arrangement shown in FIG. 6.

When an electric current is supplied to the primary coil 23, an alternating magnetic flux having the same frequency as that of the AC power source 22 occurs in the magnetic core 21. Thus, an electromotive force is induced in each of the secondary and tertiary coils 24 and 25 which are crossed by said magnetic flux. As a result, a short circuit current resulting from the electromotive force flows through the tertiary coil 25. Closure of the switch 26 causes a short circuit current to flow through the secondary coil 24. The short circuit currents flowing through the secondary coil 24 and tertiary coil 25 are substantially in phase with each other and lag by 180° in terms of electrical angle behind the current flowing through the primary coil 23. A magnetic equivalent or analogy of the FIG. 6 arrangement is shown in FIG. 7. Magnetic fields resulting from the short circuit currents flowing through the secondary coil 24 and tertiary coil 25 act in such a direction as to cancel a magnetic field produced by the primary coil 23. Therefore, on the assumption that a magnet 27 is magnetically equivalent to the primary coil 23, magnets 28 and 29 can be considered equivalent to the tertiary coil 25 and secondary coil 24, respectively. Thus, a repulsive force acts between the magnets 27 and 28, while an attractive force occurs between the magnets 28 and 29. As a result, the tertiary coil 25 is displaced toward the secondary coil 24. A force resulting from such displacement of the tertiary coil is utilized to open or close a contact mechanism or drive a brake shoe, clutch or the like.

Obviously, a short circuit ring may be used instead of the tertiary coil 25, as described earlier.

Figure 8:
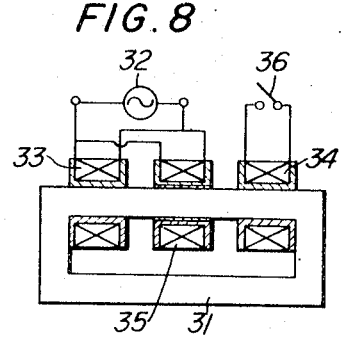
Figure 9:
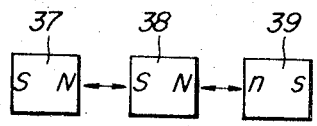
FIG. 9 shows a magnet arrangement which is an equivalent or analogy of the arrangement shown in FIG. 8.

Referring to FIG. 8, the tertiary coil of FIG. 6 is replaced with a coil 35 which is connected electrically in parallel with a primary coil 33. The primary coil 33 and the coil 35 are connected with a power source 32 in such a manner that currents in phase with each other flow therethrough. Thus, it will be seen that the coils 33 and 35 are equivalent to magnets 37 and 38 of FIG. 9 respectively. A secondary coil 34 is equivalent to a magnet 39. As will be seen from FIG. 9, an attractive force acts between the magnets 37 and 38, and a repulsive force between the magnets 37 and 38 and the magnet 39.

By controlling the current flowing through the coil 35, the force acting between the coils 33, 34 and 35 can easily be adjusted, and the coil 35 can easily and positively be driven. This constitutes a great advantage of the present embodiment.

Figure 10:
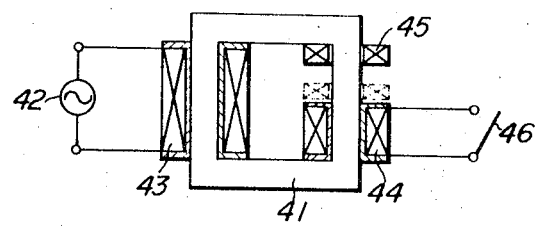
FIG. 10 is a view showing another modification of the arrangement shown in FIG. 6.

FIG. 10 shows a modification of the structure shown in FIG. 6, wherein a primary coil 43 connected with an AC power source 42 is wound on one side of close-loop magnetic core 41. A secondary coil 44 is wound on the side opposing said one side of the core and a short circuit ring 45 is movably provided thereon. The secondary coil 44 is connected with a switch 46 so that it is short-circuited by closing the switch.

When the primary coil 43 is connected with the power source 42, an alternating flux occurs in the magnetic core 41. The short circuit ring 45 is crossed by the magnetic flux, and therefore an induction current flows therethrough. Similarly, an induction current flows through the secondary coil 44 upon closure of the switch 46, since the secondary coil is also crossed by the magnetic flux. The inducting current flowing through the secondary coil 44 is in phase with that flowing through the short circuit ring, so that an attractive force occurs between the short circuit ring and the secondary coil 44. As a result, the short circuit ring is moved from a position indicated by a solid line to a position indicated by a broken line.

Figure 11:
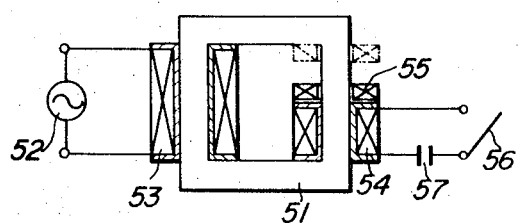
FIG. 11 is a view showing a modification of the arrangement shown in FIG. 10.

FIG. 11 shows another modification of the structure shown in FIG. 6, wherein a parallel circuit of a switch 56 and capacitor 57 is connected across the secondary coil 54. When the primary coil 53 is connected with an AC power source 52, an alternating magnetic flux occurs in the magnetic core 51, and simultaneously an induction current flows through the short circuit ring 55. At this point, since the switch 56 is opened, no induction current flows through the secondary coil 54 but merely an electromotive force occurs therein. That is, no induction current flow through the secondary coil 54 until the switch 56 is closed. By selecting the impedance based on the capacitance of the capacitor 55 to be sufficiently high as compared with the impedance based on the inductance of the secondary coil 54, the phase of the current flowing through the secondary coil 54 can be made to approach the phase of the current flowing through the primary coil 53. Consequently, a repulsive force acts between the secondary coil 54 and the short circuit ring 55, so that the short circuit ring is displaced from a position indicated by a solid line to a position indicated by a broken line. The repulsive force can be adjusted by changing the phase of the current flowing through the secondary coil 54.

Figure 12:
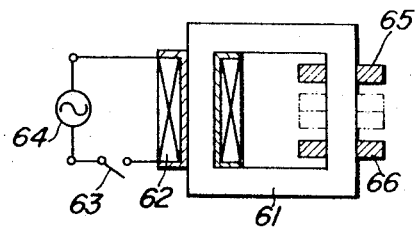
FIG. 12 is a view showing another modification of the arrangement shown in FIG. 10.

Referring to FIG. 12, a primary coil 62 is wound on one side of a magnetic core 61. An AC power source 34 is connected with the primary coil 62 through a switch 63. On the opposing side of the magnetic core 61 are movably mounted a pair of short circuit rings 65 and 66.

Upon closure of the switch 63, an AC current flows through the primary coil 62 to produce an alternating magnetic flux, which crosses the short circuit rings 65 and 66 so that electromotive forces are induced therein, thus resulting in an induction current flow therethrough. The resulting induction currents are in phase with each other. Thus, the short circuit rings 65 and 66 attract each other, so that each of them is moved from a position indicated by a solid line to a position indicated by a broken line.

Figure 13:
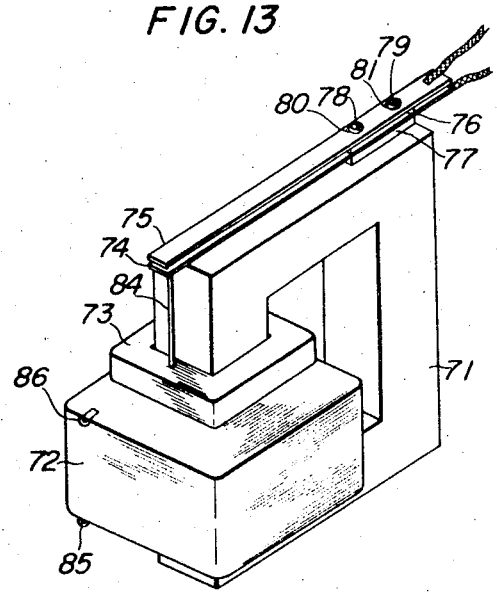
FIG. 13 is a perspective view showing a concrete example of the device embodying the present invention.

Referring to FIG. 13, there is shown a concrete example of the device embodying the present invention, wherein a primary coil 72 is fixedly wound on a magnetic core 71 constituted by lamination of silicon steel plates having directional properties, and a primary coil 73 with fewer turn that the primary coil 72 is movably wound thereon in close relationship to the primary coil 72.

An insulating member 76 formed of a plastic material is held between the end portions of contact plates 74 and 75, and a similar insulating member 77 between the magnetic core 71 and the contact plate 74, whereby the contact plates and magnetic core are electrically insulated from each other. These contact plates 74, 75 and insulating members 76, 77 are fixedly attached to the magnetic core by means of screws 78, 79 and washers 80, 81. On the then ends of the contact plates 74 coil 72 75 are fixedly provided contacts 82 and 83 in opposing relationship with each other, respectively. Normally, these contacts oppose each other with a predetermined spacing maintained therebetween. That end of the contact plate 74 on which the contact 82 is mounted is connected with the secondary coil 73 by means of a connecting rod 84, so that the contact 82 is disposed into or out of engagement with the contact 83 provided on the contact plate 75 through displacement of the secondary coil 73.

Figure 14:
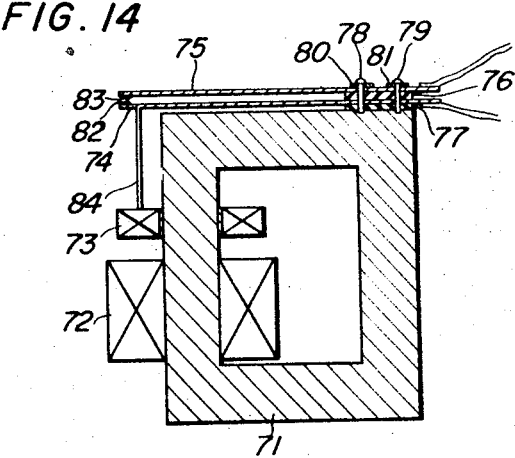
FIG. 14 is a sectional view of the structure shown in FIG. 13.

FIG. 14 shows a cross section of the device shown in FIG 13.

When an AC power source is connected across terminals 85 and 86 of the primary coil 72, a current is caused to flow through the primary coil 72, and the resulting magnetic flux flows predominantly through the magnetic core 71. The magnetic flux crosses the secondary coil 73, so that a voltage is induced across the secondary coil 73. At this point, if the opposite ends of the secondary coil 73 are connected directly with each other or short-circuited, then a current flows through the secondary coil 72 because of the induced voltage. This current lags by about 180° in terms of electrical angle behind the current flowing through the primary coil 72. Thus, the magnetic fluxes resulting from the currents flowing through the coils 72 and 73 are about 180° out of phase with each other. Consequently, a repulsive force acts between the primary coil 72 and the secondary coil 73 to cause the secondary coil 73 to be pushed upwardly (as viewed in the drawing) against the resiliency of the contact plate 74 connected therewith through the connecting rod 84. Thus, the contact plate 74 is flexed to cause the contact 82 to approach the contact 83 on the contact plate 75 and finally disposed into engagement therewith. Upon disconnection of the AC power source from the primary coil 72, the repulsive force acting between the primary coil 72 and the secondary coil 73 vanishes so that the secondary coil 73 is pushed down so as to be returned to original position because of the resiliency of the contact plate 74.

Of course, use may be made of a short circuit ring formed of a good electric conductor such as copper, aluminum or the like, instead of the secondary coil 73.

I claim:

1. A contact actuator comprising, in combination, a relay coil assembly having a magnetic core with a plurality of side portions surrounding a central opening defined therein; a first coil stationarily mounted on said magnetic core; a second coil movably mounted on said magnetic core; one of said coils being operatively connected to an AC power supply, the other of said coils being short-circuited; a plurality of conductive contact members electrically separated and in spaced parallel relation to each other; one end of each of said contact members being fixedly mounted on said magnetic core; and means operatively connecting the other end of a first contact member and said movable coil to thereby drive said other end of said first contact member into electrical contact with the other end of second contact member.

2. A contact actuator according to claim 1, wherein said movable coil is connected in parallel relation across a capacitor and a variable resistor.

3. A contact actuator according to claim 1, comprising at least two stationary coils oppositely mounted on one side portion of said magnetic core, a first one of said stationary coils being operatively connected with said AC power supply, a second one of said stationary coils being operatively connected to a short-circuiting switch; said movable coil being disposed between said first and second stationary coils and being connected in a short-circuited manner.

4. A contact actuator according to claim 1, comprising at least two stationary coils oppositely mounted on one side portion of said magnetic core, a first one of said stationary coils being operatively connected with said AC power supply, a second one of said stationary coils being operatively connected to a short-circuiting switch; said movable coil being disposed between said first and said second stationary coils, wherein said movable coil is operatively connected to said power supply in the same current phase relationship with said first stationary coil.

5. A contact actuator according to claim 1, further comprising a first stationary coil mounted on a first side portion of said magnetic core and operatively connected with said AC power supply; a second stationary coil mounted on an opposite side portion from said first stationary coil and operatively connected with a short-circuiting switch; said movable coil being carried by said opposite side portion in alignment with said second stationary coil and being connected in a short-circuited manner.

6. A contact actuator according to claim 5, further comprising a capacitor connected across said second stationary coil through said short-circuiting switch.

7. A contact actuator according to claim 1, wherein said short-circuited movable coil comprises a conductor ring.